United States Patent [19]
Sherman

[11] Patent Number: 5,509,862
[45] Date of Patent: Apr. 23, 1996

[54] RIGHT ANGLE DIFFERENTIAL DRIVE GEAR ASSEMBLY

[75] Inventor: James F. Sherman, Brighton, Mich.

[73] Assignee: General Motors Corporation, Detroit, Mich.

[21] Appl. No.: 359,684

[22] Filed: Dec. 19, 1994

[51] Int. Cl.$^6$ .......................... F16H 37/06; F16H 57/00; F16H 48/06
[52] U.S. Cl. .................. 475/230; 475/246; 74/665 F; 74/665 H; 74/410
[58] Field of Search .................. 74/410, 412, 665 F, 74/665 H, 665 S, 665 T; 475/230, 246, 346

[56] References Cited

U.S. PATENT DOCUMENTS

| | | | |
|---|---|---|---|
| 1,040,443 | 10/1912 | Signor | 74/410 |
| 1,244,223 | 10/1917 | McInish | 475/230 |
| 1,384,483 | 7/1921 | Penrod | 475/203 |
| 1,514,522 | 11/1924 | Hilmes | 74/410 |
| 2,311,393 | 2/1943 | Honeywell | 74/665 T X |
| 2,565,539 | 8/1951 | Wildhaber | 74/410 |
| 4,602,527 | 7/1986 | Tamiya | 475/230 |
| 5,233,886 | 8/1993 | Bossler, Jr. | 74/665 F |
| 5,247,856 | 9/1993 | Cuypers | 74/665 F |

FOREIGN PATENT DOCUMENTS

| | | | |
|---|---|---|---|
| 4005204 | 8/1990 | Germany | 475/230 |
| 560069 | 3/1957 | Italy | 74/665 H |

Primary Examiner—hoi Q. Ta
Attorney, Agent, or Firm—Donald F. Scherer

[57] ABSTRACT

A differential gear assembly has a pair of face gears meshing with intermeshing input and idler gears respectively. The face gears are secured by threaded fasteners carrier assembly which houses a pair of pinion side gears rotatably mounted on a pin or shaft, and a pair of output side gears both meshing with each pinion side gear. The output gears are connected with output shaft members which extend outwardly through the carrier and a surrounding housing. The separating forces generated between the meshing gear pairs (i.e., input/face, idler/face and pinion side/pinion output gears) are absorbed by the carrier assembly. The housing structure enclosing the gear members and carrier assembly is free from the gear separating forces.

2 Claims, 1 Drawing Sheet

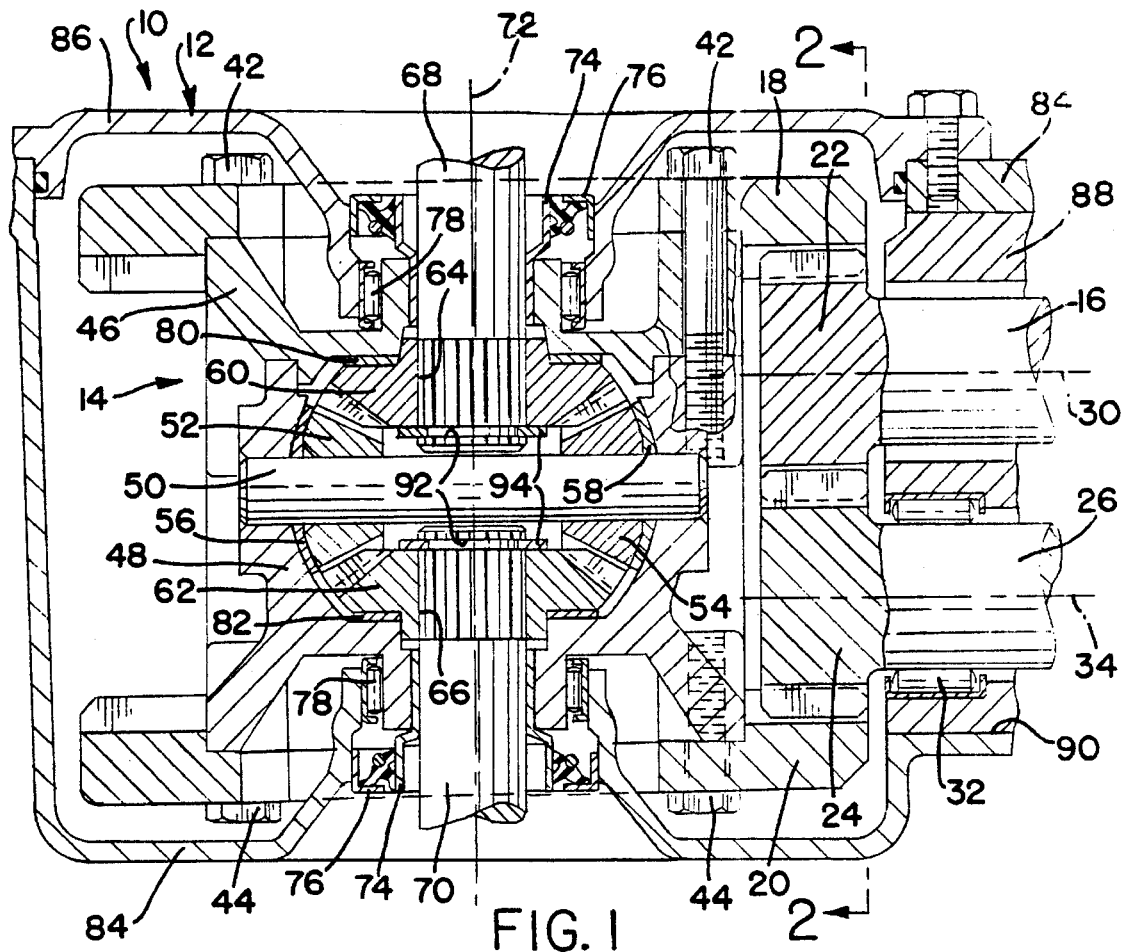
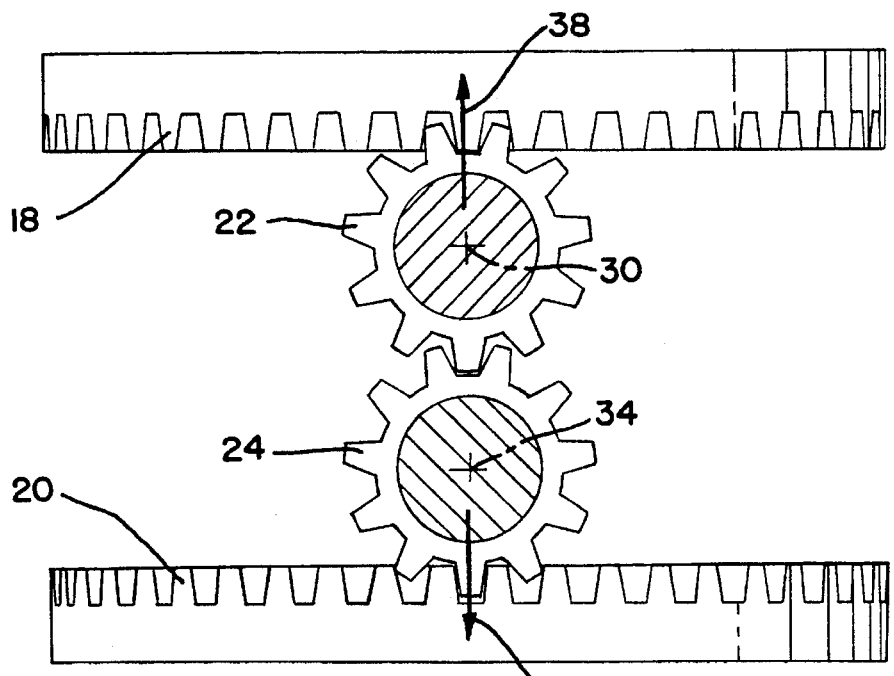

RIGHT ANGLE DIFFERENTIAL DRIVE GEAR ASSEMBLY

TECHNICAL FIELD

This invention relates to gear assemblies, and more particularly, to the containment of gear separating forces in such assemblies, and specifically to right angle drives.

BACKGROUND OF THE INVENTION

Right angle drives, such as differential gear assemblies, generally have a carrier member which includes two pinion side gears and two output side gears. The pinion gears are rotatably mounted on a pinion pin or shaft fixed in the carrier and mesh with the output gears which are drivingly connected to respective output shafts by a conventional spline arrangement.

The output shafts are rotatably mounted in the carrier or in the housing surrounding the carrier. The assembly has an input pinion and ring gear disposed in meshing relation with the input pinion rotatably supported in the housing and the ring gear secured for rotation with the carrier. The meshing gears have separating forces generated therebetween when torque loads are imposed on either the input pinion or the output shafts. Much of the separating forces are absorbed or reacted by the housing.

The reaction loads impose manufacturing requirements on the housing that might otherwise be lessened if the separating loads were not present. For example, the housing material is of concern when these loads are present, both from a strength standpoint and from a physical properties analysis. The thermal expansion coefficient must be very similar, if not identical, to the members being supported. This results in the use of steel or iron which add weight to the vehicle employing the differential.

SUMMARY OF THE INVENTION

It is an object of the present invention to provide an improved right angle drive assembly, wherein the gear separating radial forces are contained in a carrier assembly.

It is another object of the present invention to provide an improved right angle drive assembly having a reduced weight housing.

It is yet another object of this invention to provide an improved right angle drive assembly, wherein a pair of gear meshing input gears mesh with respective face gears secured to the carrier, such that the gear moth radial separation forces are fully absorbed in the carrier assembly.

To accomplish these objects, a right angle drive, such as a differential assembly comprised of a carrier, two pinion side gears, two output side gears, two input pinion gears and two input face gears, is provided. The pinion side gears are rotatably supported in the carrier on a pin or shaft. The output side gears mesh with the pinion side gears and are drivingly connected via splines to respective output shafts. The input pinion gears mesh with each other and with respective ones of the input face gears which are secured, by threaded fasteners, to opposite sides of the carrier coaxial with respective ones of the output shafts.

During torque input to the differential assembly, via the meshing input pinion gears, a force is generated in the radial direction to separate the meshing gears. This force is counteracted by the separating forces between the face gears and the respective input pinion gears. The face gears are secured to the carrier by threaded fasteners, such that the forces on the face gear are transmitted to the carrier in opposite directions, and therefore fully absorbed within the carrier assembly.

The carrier, output shafts and input shafts can be mounted in a housing on simple needle or roller bearings, since no thrust loads will be transferred from these elements to the housing. This permits the housing to be manufactured from a light material, such as aluminum or sheet metal with thin wall sections.

DESCRIPTION OF THE DRAWINGS

FIG. 1 is a cross-sectional elevational view of a differential assembly incorporating present invention.

FIG. 2 is a view taken along line 2—2 of FIG. 1, showing the input pinion gears and face gears in meshing relation.

DESCRIPTION OF AN EXEMPLARY EMBODIMENT

Referring to the drawings, there is seen a differential assembly, generally designated 10, having a housing 12, a carrier assembly 14, an input shaft 16, a pair of face gears 18 and 20, and a pair of pinion input gears 22 and 24. The pinion gear 22 is drivingly connected with the input shaft 16, while the pinion gear 24 is drivingly connected with an idler shaft 26. The input shaft 16 is rotatable about an input axis 30, and the idler shaft 26 is rotatably supported on a needle bearing 32 for rotation about an idler axis 34.

The face gears 18 and 20 are manufactured utilizing the face gear tooth cutting techniques which eliminates the need for bevel gear surfaces. Thus, the tooth mesh between the input gear 22, idler gear 24 and face gears 18 and 20 are disposed essentially to the input axis 30 and idler axis 34. With this meshing arrangement, the separating tooth forces extend radially outward from the input gear 22 and output gear 24, as depicted by Arrows 38 and 40. The force 38, on the face gear 18, is absorbed or reacted by a plurality of fasteners 42, while the force 40 on the face gear 20 is reacted by a plurality of fasteners 44.

The fasteners 42 and 44 secure the respective face gears 18 and 20 to the carrier assembly 14. The carrier assembly 14 includes a pair of housing members 46 and 48 which are secured as a single unit by the fasteners 42. The housing member 48 has a support shaft 50 disposed therein, on which is rotatably mounted a pair of side pinion gears 52 and 54. The pinion gears are supported in the housing 14 by conventional thrust bearings 56 and 58, respectively.

The pinion gear 52 meshes with a pair of side gears 60 and 62, which are splined at 64 and 66, respectively, with output shafts 68 and 70. The side gears 60 and 62 also mesh with the side pinion gear 54. This gearing arrangement provides a well known differential gear mechanism which permits the output shafts 68 and 70 to rotate either in unison or at a differential speed, depending on the load requirements at the respective output shafts 68 and 70, as exemplified by the vehicle wheels driven thereby.

The operation of differential devices is well known, and especially, in their use in automobiles as the method of establishing torque division when a vehicle is driven around corners or when one wheel is on a slippery surface.

The pinion gears 52 and 54 rotate with the carrier housing 48 due to the shaft 50. The carrier 14 and pinion side gears 52 and 54 therefore rotate about an output axis 72 of the output shafts 68 and 70. This axis of rotation is essentially 90 degrees to the input axis 30. The output shafts 68 and 70 extend outwardly through the housing 12. Each shaft has a sleeve 74 secured thereto which reacts on a seal 76 secured in the housing 12. The sleeve 74 and seal 76 cooperate to prevent the leakage of fluid from inside of the differential assembly 10.

The housing member 48 is rotatably supported in the housing 12 by a needle bearing 78 and, likewise, the housing member 46 is rotatably supported in the housing 12 by a needle bearing 78. The seal 76 permits the relative rotation between the carrier housings 46 and 48 and the output shafts 68 and 70, respectively. The output gears 60 and 62 are rotatably supported from a thrust standpoint by thrust bearings 80 and 82, respectively.

It should be apparent to one skilled in the art, at this point, that the separating forces created between the side pinion gears 52 and 54 and the output side gears 60 and 62 are contained within the differential housings 46 and 48. The forces imposed on these gears members will be equal and in opposite directions and the housings 46 and 48 are held as a single unit by the fasteners 42.

Since the high forces generated by torque transmission are retained within the carrier assembly 14, the housing 12 can be made of a thin-walled material, such as aluminum or sheet metal. The housing is preferably a two component unit having a main body portion 84 and a cover portion 86.

An end wall 88, which supports the bearing 32, is secured within an opening 90 formed in the main body 84 and the cover 86. As previously mentioned, these bearings rotatably support the shafts 16 and 26. Since the separating forces, as depicted by Arrows 38 and 40, are directed outward and absorbed by the face gears 18 and 20. The bearing 30 is required to accommodate the rotary motion of idler shaft 26 and the sum torque reaction of output shafts 68 and 70. The axial thrust loads resulting from the helix angles of gears 22 and 24 are accommodated by conventional thrust bearings, not shown. Thus, there is no large forces transmitted between the main body 84 and the housing assembly 12.

The simplicity of manufacturing and constructing the differential should now be apparent. The differential assembly 14, along with the face gears 18 and 20 and the gears 16 and 26, as well as the wall 88, can all be assembled and then encased by the housing 12. The output shafts 68 and 70 can be installed either before or after this process. If they are installed afterward, the shafts are manufactured with a locking ring groove 92 in which a lock ring 94 is assembled. The groove is made deep enough or the lock ring wall thin enough, such that the locking ring can be compressed in the groove and the shaft can be inserted into the respective gear member 60 and 62. This will permit assembly of the shafts after the housing 12 has been placed around the differential assembly 14.

From the foregoing description, it should be readily apparent that advantages of this invention, that is, in providing a light thin walled housing, are accomplished by retaining the major thrust forces generated by torque loads within the gear members within the housing of the right angle drive assembly. This will, as mentioned above, permit the use of a thin walled light weight housing, thereby improving the overall operating efficiency of a vehicle in which a differential is utilized by reducing the total weight of the differential assembly.

The embodiments of the invention in which an exclusive property or privilege is claimed are defined as follows:

1. A fight angle gear assembly comprising:

a housing;

an input shaft;

an idler shaft;

bearing means for rotatably mounting said input shaft and said idler shaft in said housing;

first and second gears meshing and disposed for continuous rotation with the input shaft and idler shaft, respectively, and generating separating forces on said meshing gears;

a gear carrier rotatably disposed in the housing; and first and second input face gears secured TO said carrier and disposed in meshing relation with said first and second gears respectively at diametrically opposed locations on said fiRst and second gears with the separating forces being transmitted to the carrier through the input face gears, said carrier absorbing the separating forces and said housing being free from the separating forces.

2. A right angle gear assembly comprising:

a differential housing;

an input shaft;

an idler shaft;

bearing means for rotatably mounting said input shaft and said idler shaft in said housing;

first and second gears meshing and disposed for continuous rotation with the input shaft and idler shaft, respectively, and generating separating forces on said meshing gears;

a gear carrier assembly rotatably supported in the differential housing;

first and second differential input gears secured to said carrier and disposed in meshing relation with said first and second gears respectively at diametrically opposed locations on said first and second gears with the separating forces being transmitted to the carrier through the differential input gears, said carrier absorbing the separating forces and said housing being free from the separating forces; and said carrier assembly including a pair of housing members secured together by fasteners, a pair of side gear members rotatably mounted on a pin supported in one of the housing members, and a pair of output gears meshing with the side gear members, said fasteners and said housing members absorbing gear separating reaction forces between said side gear members and said output gears.

* * * * *